United States Patent
Meillot et al.

(10) Patent No.: US 7,981,371 B2
(45) Date of Patent: Jul. 19, 2011

(54) DEVICE AND METHOD FOR DESTROYING LIQUID, POWDER OR GASEOUS WASTE USING AN INDUCTIVELY COUPLED PLASMA

(75) Inventors: Erick Meillot, Monts (FR); David Guenadou, Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 1286 days.

(21) Appl. No.: 10/588,955

(22) PCT Filed: Feb. 16, 2005

(86) PCT No.: PCT/FR2005/050099
§ 371 (c)(1),
(2), (4) Date: Aug. 10, 2006

(87) PCT Pub. No.: WO2005/080873
PCT Pub. Date: Sep. 1, 2005

(65) Prior Publication Data
US 2008/0286169 A1    Nov. 20, 2008

(30) Foreign Application Priority Data

Feb. 18, 2004  (FR) .................................... 04 50303

(51) Int. Cl.
*B01J 19/08*    (2006.01)
*A62D 3/10*    (2007.01)
(52) U.S. Cl. .................. 422/186; 422/186.29; 588/301; 588/311
(58) Field of Classification Search ................ 422/186, 422/186.29; 588/301, 311
See application file for complete search history.

(56) References Cited

U.S. PATENT DOCUMENTS

| | | | |
|---|---|---|---|
| 5,026,464 A * | 6/1991 | Mizuno et al. ................ 588/311 |
| 5,877,471 A | 3/1999 | Huhn et al. |
| 6,153,158 A | 11/2000 | Flannery et al. |
| 6,153,852 A * | 11/2000 | Blutke et al. ............. 219/121.59 |
| 6,552,295 B2 * | 4/2003 | Markunas et al. ....... 219/121.36 |
| 7,666,381 B2 * | 2/2010 | Henderson et al. ........ 423/447.1 |

FOREIGN PATENT DOCUMENTS

| | | |
|---|---|---|
| FR | 2 640 148 | 6/1990 |
| FR | 2 765 322 | 12/1998 |

* cited by examiner

*Primary Examiner* — Kishor Mayekar
(74) *Attorney, Agent, or Firm* — Oblon, Spivak, McClelland, Maier & Neustadt, L.L.P.

(57) ABSTRACT

The invention relates to a device and a process for the destruction of toxic or hazardous chemical products using inductively coupled plasma. These products may occur in liquid, gaseous or powder form and belong to the family of organic or halogenated organic compounds.

27 Claims, 2 Drawing Sheets

DEVICE AND METHOD FOR DESTROYING LIQUID, POWDER OR GASEOUS WASTE USING AN INDUCTIVELY COUPLED PLASMA

TECHNICAL FIELD

This invention relates to a device and a process for the destruction of toxic or hazardous chemical products using inductively coupled plasma. These products may occur in liquid, gaseous or powder form and belong to the family of organic or halogenated organic compounds.

PRIOR ART

The problem of waste processing has been a crucial problem for the last ten years or so. In the past most waste was disposed of by being "discharged", usually in an uncontrolled manner. Now, however, changes in the nature and quantities of waste mean that an industrial approach to the treatment of waste is required.

Numerous processing technologies have been implemented for the treatment of waste, so that development can still occur without causing damage to the environment. These highly effective technologies for the destruction of waste all have in common to offer, at the same time, a process for the destruction of waste, for the processing of the fumes produced by this destruction and for the management of any liquid or solid residues that may be produced.

Thermal processes are generally used for the destruction of waste in order to overcome the problem posed by the stability of many chemical compounds. Thus, installations for the destruction of hazardous products are traditionally incinerators. For example, liquid products are mixed with solid products so that they may be burned. But volatile residues are obtained from the incineration of waste. In addition, these installations need to be of significant size in order for the reaction between the fuel and comburant to be complete and in order to reduce operating costs.

In order to overcome these drawbacks, numerous processes for the destruction of waste use plasma technologies. Actually, the use of plasma processes has the advantage of reducing the size of the installation required, since plasma incinerators allow very high temperatures to be achieved and consequently accelerate the chemical reactions involved in the destruction of waste and in the recombination of the chemical elements produced in this way.

In the document [1] referred to at the end of this description, the destruction of organic products using a blown plasma arc is considered. The gas produced by the combustion of waste is mixed with air, water or oxygen at the outlet of the plasma torch in a segmented tubular stage. This technology allows the destruction of gaseous waste to be carried out more readily by mixing the waste with the plasma gas emerging from the plasma arc torch. The efficiency is reduced, however, due to the fact that the feed to be destroyed does not pass inside the torch. The destruction of liquid products proves to be more complicated due to the difficulty of mixing a liquid phase homogenously with a high-temperature, high-velocity gas phase emerging from a blown arc plasma torch. This difficulty further reduces the thermal performance and efficiency of the process.

Another example of the use of blown arc plasma is given in documents [2] and [3]. Waste to be destroyed is introduced into a tubular blown arc plasma torch after it has undergone a change of phase into the gaseous state by means of an initial burner.

In the technique presented in document [2], the fact that the feed is vaporised in order for it to enter the plasma torch means that there is both an increase in the efficiency of destruction in the process and a considerable increase in the complication of the process due to the constant monitoring needed to ensure that there is proper vaporisation of the feed. The addition of the gas burner, which requires a large supply of air in order to operate correctly, results in a large gas flow in which the overall proportion (by mass) of the feed is reduced.

The process described in document [3] allows the material to be destroyed to be introduced directly into the plasma torch, irrespective of whether it is gaseous or liquid. This process uses technology for stabilising the electric arc in the torch using a magnetic field. Since this process involves the use of significant amounts of electrical energy, it is reserved for the destruction of products that occur in very large quantities. In addition, no mention is made of the type of gas used for the operation of the torch or for control of atomic recombination. This process, therefore, carries out destruction of products by pyrolysis, that is, without the addition of oxygen. This leads to highly reducing gases being produced which must be burnt at the torch outlet before being discharged into the atmosphere.

In document [4], waste is mixed with water or methanol and is introduced into a tubular arc torch. Oxygen is also used as a plasma gas instead of air. The objective of these modifications is to improve the degree of destruction of the waste. This technique uses a segmented tubular arc torch, technology which is relatively scarcely used and which requires a good understanding of plasma technology in order to define stable operating conditions. The introduction of two phases (liquid and gaseous) in this type of technology does not facilitate the achievement of stable operating conditions.

In document [5], a plasma burner is used to purify and decontaminate the gases emerging from a standard incinerator. Thus, high temperature post-combustion is achieved with the injection of air into the mixing chamber with the gaseous products to be neutralised. Once more, with this process the plasma torch is used as a supply of additional energy for purifying the gas. It is therefore not possible to process liquids directly without vaporising them beforehand in a traditional incinerator, for example, as described in this document. In addition, the fact that the feed is not introduced into the torch itself (for reasons of incompatibility of material) greatly reduces the efficiency of the process.

Radio frequency or high-frequency plasmas can also be used. For example, in document [6], solid products to be destroyed are first of all introduced into a rotary furnace in order that they may be converted into a gaseous form. The gas stream is then directed towards a collector, where it is mixed with a carrier gas and possibly with liquid waste. This combination is then introduced into a high frequency plasma torch. The products that emerge from the torch then pass into a centrifuge fitted with a coil system that generates magnetic and electric fields. This system, then, is used to separate the various elements. The primary aim of this technique is to separate the various constituents of the feed, with, possibly, recovery of recoverable products (heavy elements etc.) The torch has a special geometry into which feed is introduced through an unspecified collector. The field temperature achieved (300-1000° C.) does not allow destruction in the strict sense of the term to take place, but rather produces correct conditions for separation of the various components.

Document [7] relates to the destruction of gaseous toxic products of military origin by using a plasma torch operating by using a mixture of air and argon. Water/air quenching is introduced at the output of the torch in order to halt the reactions. The feed to be destroyed either passes into a module for making the products inert as described in this document, or into the plasma module. It therefore appears that it is principally gas that is directed towards the plasma module. The introduction of liquid is only a possibility which depends on the composition of the feed.

PRESENTATION OF THE INVENTION

The aim of the invention is to destroy organic or halogenated organic products alone or as mixtures, in a safe manner with controlled discharge of gaseous non-toxic products into the atmosphere and trapping of recombination products that are harmful to the environment. The objective of this invention is therefore to return products to the atmosphere that are non-toxic or which are a not a hazard to man or his environment.

The invention proposes a device and a process for the destruction of chemical products, in particular of special wastes which exhibit high stability and a high degree of chemical toxicity. In other terms, the device and the process as described in the invention are used to process various chemical products which offer potential hazards to man or his environment and which therefore require close continuous monitoring during the course of their lifetimes.

The invention relates to a thermal destruction process for at least one organic or halogenated organic product in liquid, gaseous or powder form. This process involves the following steps:
  mixing:
    of the aforementioned one or more organic products with water in sufficient quantities to ensure that at least stoichiometric ratios between atoms of carbon and oxygen in the mixture are obtained, or
    of the aforementioned one or more halogenated organic products with water in sufficient quantities to ensure that at least the stoichiometric ratios for, on the one hand, atoms of carbon and oxygen in the mixture, and on the other hand, for hydrogen and halogen atoms in the mixture are obtained,
  introduction of this mixture and of plasmagenic gases into the coil of an inductively coupled plasma torch to produce gas in which decomposition into atomic elements has occurred,
  an initial thermal destruction operation of the aforementioned gas in which decomposition into atomic elements has occurred, this initial operation taking place in a reaction chamber,
  a second thermal destruction operation of the gas that has undergone the initial destruction operation, this second destruction operation taking place in a stirring device with no energy being added and in which the gas which undergoes the second thermal destruction operation is stirred with air and/or oxygen,
  recombination by cooling of at least a part of the gas emerging from the stirring device,
  discharge of the gas that has been destroyed.

The mixing of the products to be destroyed with water is carried out using water in a liquid form for liquids and powders, or with water in the form of vapour for gases. The mixture must have a waste/water ratio that is at least equivalent to the atomic stoichiometric ratio for carbon and oxygen atoms in the mixture. In the special case of halogenated organic products, the waste/water ratio must, in addition, be at least equivalent to the atomic stoichiometric ratio for the hydrogen and halogen atoms in the mixture.

Advantageously, the mixture of the at least one organic product or halogenated organic product with water is introduced at the inductive plasma torch coil in the form of a spray if the aforementioned organic product or halogenated organic product is in a liquid or powder form, or in a gaseous form if the aforementioned organic or halogenated organic product is in a gaseous form.

Advantageously, the gas after destruction is discharged in the atmosphere.

Advantageously, the stirring device is a venturi.

In a specific case, the destruction process further includes a cooling step for the gas emerging from the step of recombination by cooling in a device which carries out heat exchange with the surroundings.

Advantageously, the process further includes a step for analysing the gas emerging from the step of recombination by cooling.

Advantageously, the process further includes a gas pressure regulation step.

In this case, the regulation step is advantageously carried out using a pump device (regulator valve, vacuum pump, regulation plant), referred to as the vacuum plant.

In one specific case, the process includes at least one chemical processing step of the gas emerging from the step of recombination by cooling.

Advantageously, the aforementioned at least one chemical processing step of the gas is a step selected from amongst de-halogenation, deoxidation of nitrogen oxide and desulphurisation. This selection is made according to the nature of the gases being processed.

Advantageously, the spraying of water into the gases is carried out before the chemical treatment step of the aforementioned gases is carried out. The aim of this spraying is to lower the temperature of the gas, if necessary.

The invention also relates to a thermal destruction device for at least one organic or halogenated organic product in a liquid, gaseous or spray form. This device includes:
  an inductively coupled plasma torch,
  a means of introducing plasmagenic gases into the aforementioned torch,
  a means of introducing a mixture of water and the aforementioned one or more organic or halogenated products into the aforementioned torch,
  a reaction chamber which is suitable for the thermal destruction of gas emerging from the inductively coupled plasma torch,
  a device used to carry out the stirring of the gas emerging from the reaction chamber,
  a means of introducing air and/or oxygen into the stirring device,
  a device which allows recombination by cooling of at least a part of the gas emerging from the stirring device to take place,
with the inductively coupled torch being connected to the reaction chamber, which is connected to the stirring device, which is in turn connected to the recombination device.

Advantageously, the destruction device includes means for cooling the inductively coupled plasma torch, the reaction chamber, the stirring device and the recombination device.

Advantageously, the means of cooling the inductively coupled plasma torch, the reaction chamber, the stirring device and the recombination device are a cooling plant.

Advantageously, the reaction chamber includes a double wall inside which cooling water circulates.

Advantageously, the internal surface of the double wall is covered by refractory material. This material then acts as a protective layer.

The reaction chamber is designed so that the gas it holds can reach a sufficiently high temperature for a time that is sufficient to allow the gas to decompose into other less reactive gases.

Advantageously, the introduction of plasmagenic gases into the torch is carried out by over-pressurisation. Advantageously, the means for introducing plasmagenic gases into the torch comprises a standard gas plant (storage cylinders) where gases are introduced in a standard manner using over-pressurisation.

Advantageously, the means for introducing a mixture of water and waste into the torch is a spray probe if the mixture is in the form of a liquid or suspension, or an injection probe if the mixture is in gaseous form.

Advantageously, the device used to produce stirring of the gas is a venturi. The device used to produce air stirring, in particular the venturi, is used to directly produce post-combustion between the gas at high temperature emerging from the waste decomposition stage and the gas that is introduced (air or oxygen), without the addition of any supplementary energy.

In one particular case, the venturi has a water-cooled double wall.

Advantageously, the venturi comprises an upper part (named convergent), a lower part (named divergent) and a central part (known as the neck), which connects the convergent and divergent parts, and air inlet ports.

Advantageously, the venturi includes at least one means of uniformly distributing the air onto the venturi walls.

Advantageously, the one or more means for uniformly distributing the air over the walls of the venturi is a distribution chamber which includes holes arranged along its outer edge.

In a specific case, the device used for recombination by cooling of one or more parts of the gas emerging from the stirring device is a water-cooled double-walled enclosure.

Advantageously, the device as described in the invention further includes a device which allows heat exchange with the surroundings and/or a device for regulating the pressure inside the destruction device.

Advantageously, the device used for regulating the pressure is a vacuum plant.

Furthermore, the device for destruction comprises advantageously at least one device, located after the gas recombination device, allowing the gas emerging from the recombination device to be chemically processed.

Advantageously, the at least one device used for chemical treatment of the gas emerging from the recombination device could carry out a reaction selected from amongst de-halogenation, deoxidation of nitrogen oxide and desulphurisation. The reaction that is selected depends on the chemical composition of the gas and its physico-chemical properties.

The advantages of the device and the process are:

the high level of destruction obtained (a minimum of 99.995%) due to the direct injection of products to be destroyed into the plasma torch, the safety aspect due to the addition of water to the feed (that is, the products to be destroyed) outside the installation, the control of the recombination of atomic elements by the simultaneous addition of oxygen and hydrogen to carbon and halogen elements, the reduced size of the installation due to the inclusion of plasma technology and the confinement of reactions in two chambers of reduced size, acceptance of complex mixtures of products to be destroyed without precise prior knowledge of their composition.

The device and process as described in the invention offer flexibility of application in terms of wastes to be processed. Actually, the limit to the introduction of waste materials into the device is due to the fact that it does not accept waste in solid form. All products that can be presented in a liquid or gaseous form, or even in the form of a suspension, can be accepted.

The level of destruction of wastes obtained using the process and device as described in the invention is of the order of 99.995% or even 99.999%. The gas discharged by the destruction device or process meets, in particular, the requirements of the standards for discharge of gaseous products in force in the European Community, which have set an objective of "zero toxic product" discharged into the atmosphere.

BRIEF DESCRIPTION OF THE FIGURES

The invention may be better understood and other advantages and specific features will become apparent by reading the description that follows, given by way of a non-limiting example, accompanied by the appended drawings, which include.

DETAILED DESCRIPTION OF SPECIFIC EMBODIMENTS

Figure 1:
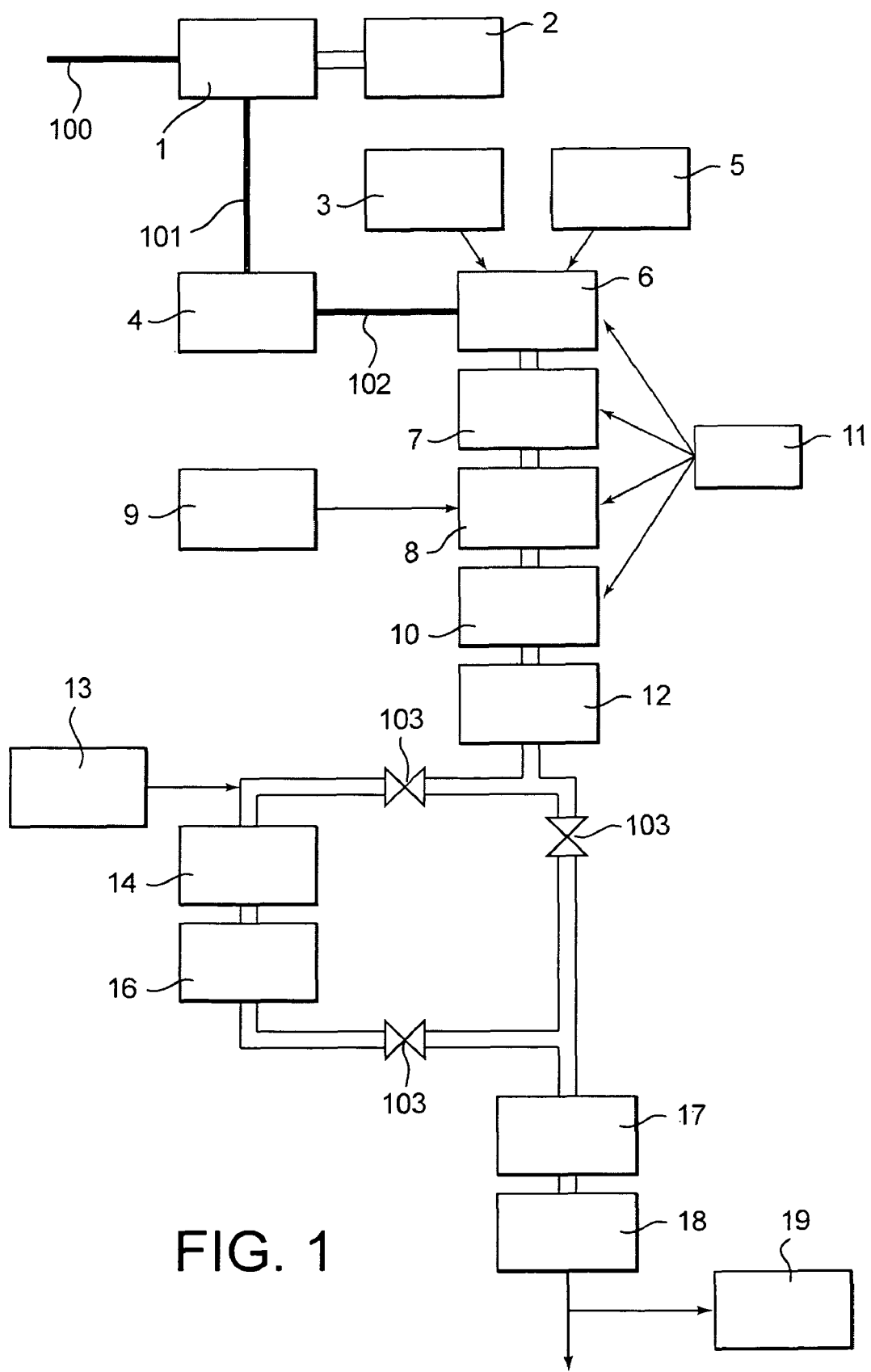
FIG. 1 is a schematic diagram illustrating the installation for carrying out the process as described in the invention.

The installation used for the thermal destruction process as described in the invention is described in FIG. 1.

An electrical generator 1 connected to a 380V/50 Hz electricity supply system (reference 100) and cooled by a cooling plant 2, supplies a plasma torch 6 with a high frequency supply through a control panel 4. This control panel may be, for example, a tuning cabinet. Reference 101 represents the coaxial cable connecting the electrical generator 1 to the control panel 4, and reference 102 illustrates an induction arm connecting the panel 4 to the plasma torch 6.

Figure 2:
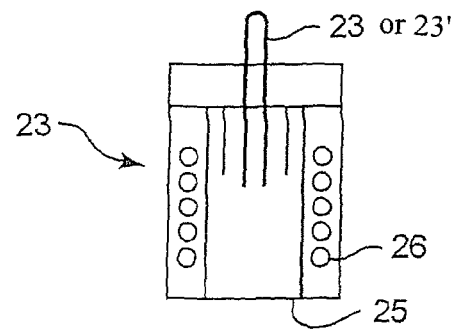
FIG. 2 is a schematic illustrating the introduction of the feed into the plasma torch.

The plasma torch 6 must be supplied with gas in order to operate. The introduction of these operating gases 3 as well as the introduction of the water/waste mixture to be processed 5 occurs directly inside the torch 6. The water and waste are mixed together beforehand, ant then the mixture is introduced into the torch 6 using a spray probe for liquids or suspensions and using an injection probe for gases (the principle of the introduction of the water/waste mixture into the torch is shown in FIG. 2).

Once they pass into the plasma torch 6, the plasmagenic gases and the water/feed mixture enter a reaction chamber 7. The function of this reaction chamber 7 is to confine the heat produced in the plasma torch so that there is complete destruction of the waste. The gas emerging from the reaction chamber can thus attain temperatures in excess of 1500° C.

Figure 4:
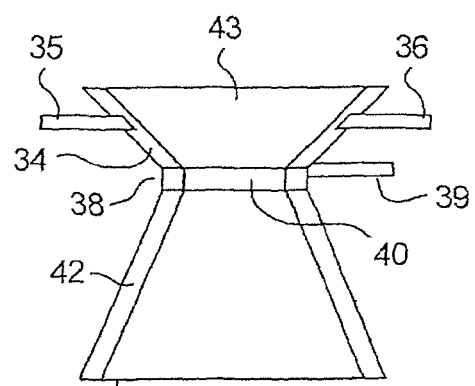
FIG. 4 is a schematic of the venturi.

At the outlet of reaction chamber 7, the gas flows into a special device known as the venturi 8. The venturi 8 is a stirring device which, due to the addition of comburant gas (air or oxygen 9) produces a second combustion (post-combustion) of the comburant with the gases emerging from reaction chamber 7. FIG. 4 shows the details of the venturi 8. This device therefore allows toxic compounds that might have escaped in the initial destruction stage in reaction chamber 7 to be destroyed. In the venturi, gases can attain temperatures in excess of 1200° C. after mixing with the comburant and undergoing exothermic combustion reactions.

The gas then flow into a space 10 in which the gas is rapidly cooled and undergoes a recombination step. This recombination space is made up of a water-cooled double walled chamber. In this space 10 the temperature falls rapidly to reach 200° C. at the outlet. Unlike reaction chamber 7, recombination space 10 is not thermally insulated: its double wall is cooled by the circulating water emerging from the cooling plant 2. In this space, the gas flows and is cooled by natural convection close to the walls.

Note that the assembly of elements made up of the inductively coupled torch 6, reaction chamber 7, the venturi 8 and recombination stage 10 is cooled by and connected to a cooling plant 11.

At the outlet from recombination space 10, the gas is analysed. The analytical device 12 is used to verify the effectiveness of the thermal process and to ascertain the composition of the gas after treatment, but above all it is used to ascertain whether or not the gas must undergo further chemical treatment.

If the gas has undergone sufficient thermal treatment for it to be discharged directly into the atmosphere, that is, if the concentrations of toxic compounds do not exceed the set limits, the gas is sent to a heat exchanger 17. In this exchanger, the gas is cooled and then passes to the vacuum plant 18 used to control the process operating pressure. The operating pressure is between several millibars and atmospheric pressure. After the vacuum plant 18, the gas is discharged into the atmosphere.

If, after thermal processing, the gas still contains toxic compounds at levels that are too high, it is sent to a treatment system. This treatment system will depend on the compounds that are to be processed. In general, this treatment system is made up of a system for neutralisation of halogens 14, a DENOX system used for catalytic de-nitrification of the gas 16 and possibly a de-sulphurisation system (not shown in FIG. 1).

Neutralisation of halogens is carried out by classical spraying of alkaline water in accordance with the example reaction for chlorine:

$$HCl+NaOH \rightarrow NaCl+H_2O$$

De-nitrification of nitrogen oxides is achieved, for example, by reaction with ammonia:

$$NO+NO_2+2NH_3 \rightarrow 2N_2+3H_2O$$

$$4NO+4NH_3+O_2 4N_2+6H_2O$$

$$2NO_2+4NH_3+O_2 \rightarrow 3N_2+6H_2O$$

A spray of water 13 could possibly be carried out before the gas enters the halogen treatment system 14 and passes into the treatment units for nitrogen oxide and/or sulphur containing products 16. This will lower the temperature of the gas in the event of excessive heat in order to protect the halogen neutralisation system.

Valves 103 are used to control the flow of gas flowing between the various components of the device. For example, in FIG. 1, the valves 103 are arranged between the analysis device 12 and the system for treating halogenated products 14, between the analytical device 12 and the heat exchanger 17, and between the units for treatment of nitrogen oxides and/or sulphur containing products 16 and the heat exchanger 17.

After undergoing these various treatments, the gas undergoes analysis 19 to determine if it may be discharged into the atmosphere. If the gas is sufficiently purified, it is cooled in heat exchanger 17 and passes into the vacuum plant 18. After the vacuum plant 18, the gas is discharged in the atmosphere 19. If the gas is still too reactive, it undergoes chemical treatment in systems 14 and 16 once more.

FIG. 2 shows the systems for introduction of the feed/water mixture 5 inside the plasma torch.

The plasma torch 6 is a high frequency or inductively coupled torch without electrodes and in which the plasma is generated by a high voltage, high frequency current passing through the coil 26. Plasma is the term used to describe the dissociation of a gas into ions, electrons and neutral species, excited or otherwise. Any type of inductive torch would be appropriate.

The plasma torch is preferably made of a non-conductive material that is permeable at high frequencies.

The feed to be processed must be mixed with a sufficient quantity of water. If the feed to be treated is in liquid or powder form then liquid water is added. If the feed to be treated is gaseous, the water added must also be gaseous (water vapour). The sufficient quantity of water to add is obtained once the feed/water ratio is, as a minimum, equivalent to the atomic stoichiometric ratio between, on the one hand, atoms of carbon and oxygen, and, on the other hand, between atoms of hydrogen and halogen, in the special case of halogenated organic products. The simultaneous addition of oxygen and hydrogen, through the liquid water or water vapour that is mixed with the feed, is used to control atomic re-combinations while ensuring that there is a high level of safety (no risk of $H_2/O_2$ explosions, for example). Thus the simultaneous atomic recombination reactions are as follows:

$$C+O \rightarrow CO$$

$$H+Cl \rightarrow HCl$$

The mixture that is made up in this way is stored in a tank while waiting to be introduced into the plasma torch.

The water/waste mixture is introduced into the heart of the plasma torch 6 in sprayed or gaseous form.

If the waste/water mixture is in the form of a liquid or suspension, it will be sprayed into the plasma torch. Since the mixture is temporarily stored in a tank, a feed pump is used to take the mixture up to the inlet of the torch and the mixture is sprayed (here in the form of a sheet of liquid) using spray probe 23, cooled using water and mechanically assisted by the introduction of gas. It should be pointed out that the introduction of the mixture into the plasma torch can be performed using any type of probe, provided that this separates the liquid sheet into fine droplets.

If the feed to be processed is a gaseous feed, the gaseous mixture is introduced into the heart of the plasma torch by means of a feed pump and a water cooled injection probe 23' Note that the spray probe 23 and injection probe 23' are identical apart from the fact that the injection probe does not require a supply of spraying gas.

The injection probe 23' or spraying probe 23 is preferably placed at the heart of the coil 26 in the plasma torch 6. The liquid, powder or gas mixture is then in contact with the plasma at the location where its temperature is highest. This position produces the maximum effectiveness both in terms of penetration of the feed into the gas stream and in terms of destruction due to the intimate contact between the two phases and the high temperatures. The probe 23' or 23 can also be moved towards the outlet 25 of the torch.

In other terms, all waste to be destroyed is mixed beforehand with water either in liquid form for liquid wastes (mixture or emulsion) or powder wastes (suspensions), or water in the form of water vapour for gaseous wastes, before it is introduced into the thermal destruction device.

The mixture of the waste with the aqueous or gaseous medium is one of the key points for success in the destruction of the waste. The waste/water ratio must be equivalent, as a minimum, to the atomic stoichiometric ratio between, on the one hand, atoms of carbon and oxygen, and, on the other hand, between atoms of hydrogen and halogen, in the special case of halogenated organic products. Thus, for example, dichloromethane waste with the chemical formula $CH_2Cl_2$ will be mixed with water in the proportions of 1 mole for 1 mole in order to activate the following reaction:

$$CH_2Cl_2 + H_2O \rightarrow CO + 2HCl + H_2$$

This mixture allows the safety aspect of the destruction device to be improved as described in the invention by avoiding the separate and simultaneous introduction of oxygen and hydrogen into the plasma. The mixture also allows gas flow rates to be reduced. Thus it results with an installation which is of reduced size and which does not require excessively large fume treatment systems.

Figure 3:
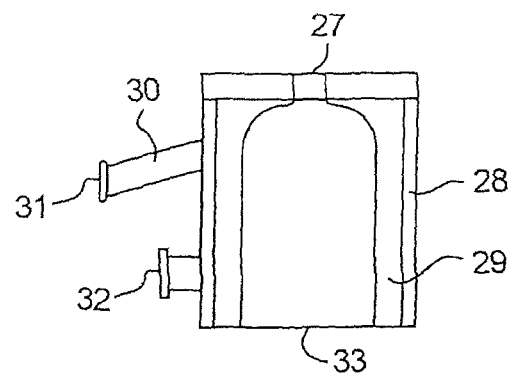
FIG. 3 is a schematic for the destruction stage.

FIG. 3 shows a schematic representation of the destruction phase. There is a reaction chamber in which the destruction of the feed will occur. This reaction chamber 7 includes a double wall 28 inside which the cooling water circulates. This double wall may be made of steel. The internal surface of the double wall is covered by a protective refractory material.

The gas emerging from torch 6 enters the reaction chamber 7 through a port 27. A sight glass port 30 is used to check the correct behaviour of gas passing through port 27. Poor gas ionisation behaviour would be characterised by:

erratic and uneven movement in the column of gas, electrical arcing onto metallic components (edge of torch, injection probe etc.), a plasma column that is incompletely formed and which remains confined inside the torch 6.

Control of the correct behaviour of the gas may be facilitated by placing a camera 31 in front of the sight-glass 30. A thermocouple 32 placed towards outlet 33 of the reaction chamber 7 is used to measure the temperature of the gas emerging from this chamber.

The gas emerging from this reaction chamber then enters a device known as a venturi. The purpose of the venturi 8 is to generate a high degree of turbulence in the reaction gas emerging from the reaction chamber, by means of an addition of cold air. This gas mixture, made up of cold air and reaction products, is used, without any addition of supplementary heat, to generate post-combustion of gas emerging from the reaction chamber. The destruction of any reactive gas that has not been converted in the reaction chamber 7 can thus be achieved. In the venturi, the various gas species such as $H_2$, CO, C etc. will react with air in accordance with the following reaction:

$$CO + H_2 + O_2 \rightarrow CO_2 + H_2O$$

The harmful gas CO is thus transformed into a less harmful gas.

The venturi 8 is made of steel and has a water-cooled double walled structure (see FIG. 4). It is made up of three parts, an upper part, referred to as the convergent 34, and a lower part referred to as the divergent 42, with these two parts being connected by a neck 38.

The convergent 34 is in contact with the gas outlet 33 of the reaction chamber 7. The convergent is made up of two orifices 35 and 36, used to inject air or oxygen into the inlet of the venturi 8 using a distribution chamber 37. The distribution chamber is a cylindrical space of several centimeters in height and width over the entire perimeter of the venturi inlet and into which the gas 10 will flow. The distribution chamber 37 is pierced by a large number of holes, for example, holes of 2 mm diameter spaced 2 mm apart, which are present over the entire perimeter of the distribution chamber 37. This distribution chamber 37 allows the gas held in the convergent 34 to be distributed in an almost uniform manner next to the walls of convergent 34, thus protecting these walls from high temperature corrosive gas.

At the neck 38 of the venturi 8, a second injection of air or oxygen takes place through an orifice 39 using a second distribution chamber 40. This second injection supplements the initial injection made in the convergent. The gas then passes into the divergent 42 and is discharged through outlet 41 of the venturi so that it enters the recombination stage 10.

One of the advantages of the device as described in the invention is that the relative positions and assembly of the various components described in the preceding paragraphs allow post-combustion of the gas emerging from the destruction phase to take place without the use of a source of energy. Actually, the relative positions of the components allow the high temperature of the gas emerging from the reaction chamber 7 to be used beneficially.

The products that may be processed by using the destruction device or process as described in the invention could be, for example, halogenated organic solvents, low calorific value contaminated aqueous mixtures, oils, cyclic aromatics, toxic gaseous C.F.C or H.C.F.C. type products, combat gases, powder products such as solid explosives in the form of slurries etc. The only limitation is that the products to be destroyed must be in liquid, gaseous or powder form.

For example, the destruction of phosgene, a gaseous product, leads to the following atomic decomposition and then to the following recombination:

$$COCl_2 + H_2O \rightarrow C + 2H + 2O + 2Cl \rightarrow 2HCl + CO_2$$

with the initial molar concentration of the mixture being 1 mole of $COCl_2$ with 1 mole of water to form 3 moles of gaseous products.

Then the HCl reacts with NaOH:

$$2HCl + 2NaOH \rightarrow 2NaCl + 2H_2O \text{ (solution)}$$

For the destruction of liquid products, for example tetrachloromethane, there are the following decomposition and recombination reactions:

$$CCl_4 + 2H_2O \rightarrow C + 4Cl + 4H + 2O \rightarrow 4HCl + CO_2$$

with the molar concentration being 1 mole of feed and 2 moles of water.

Then the following reaction takes place between HCl and NaOH:

$$4HCl + 4NaOH \rightarrow 4NaCl + 4H_2O \text{ (solution)}$$

BIBLIOGRAPHY

[1] U.S. Pat. No. 4,438,706
[2] U.S. Pat. No. 4,479,443
[3] U.S. Pat. No. 4,644,877
[4] U.S. Pat. No. 4,886,001
[5] U.S. Pat. No. 5,505,909
[6] U.S. Pat. No. 5,288,969
[7] Document FR-A-2765322

The invention claimed is:

1. A process of thermal destruction of a product which is an organic product or an halogenated organic product, the process comprising:

a) mixing the product with water, thereby obtaining a mixture, wherein quantities of water being chosen such as to ensure:
   that at least stoichiometric ratios between carbon and oxygen atoms in the mixture are obtained when the product is an organic product,
   or
   that at least the stoichiometric ratios for carbon and oxygen atoms in the mixture are obtained and that at least stoichiometric ratios for hydrogen and halogen atoms in the mixture are obtained when the product is a halogenated organic product,
b) introducing the mixture obtained in a) into a coil of an inductively coupled plasma torch together with plasmagenic gases, thereby producing gases resulting from a decomposition of said mixture obtained in a) into atomic elements,
c) submitting the gases produced in b) to a first thermal destruction operation, wherein the first destruction operation takes place in a reaction chamber,
d) submitting the gases produced in c) to a second thermal destruction operation, wherein the second destruction operation takes place in a stirring device in which no energy is added, and in which stirring is performed with air or oxygen,
e) cooling the gases emerging from the stirring device, thereby obtaining a recombination of at least a part of said gases emerging from the stirring device, and
f) discharging the cooled gases obtained in e).

2. The process of thermal destruction according to claim 1, wherein the mixture obtained in a) is introduced at the coil of the inductive plasma torch (i) in the form of a spray, when the product contained in the mixture is in a liquid or powder form, or (ii) in a gaseous form, when the product contained in the mixture is in a gaseous form.

3. The process of thermal destruction according to claim 1, wherein the stirring device is a venturi.

4. The process of thermal destruction according to claim 1, further comprising, between e) and f), cooling the gases obtained in e) in a device which allows a heat exchange with the surroundings.

5. The process of thermal destruction according to claim 4, further comprising a regulation of a gas pressure.

6. The process of thermal destruction according to claim 5, wherein the regulation is carried out using a pumping device which is a vacuum plant.

7. The process of thermal destruction according to claim 1, further comprising, between e) and f), an analysis of the gases obtained in e).

8. The process of thermal destruction according to claim 1, further comprising at least one chemical treatment of the gases obtained in e).

9. The process of thermal destruction according to claim 8, wherein the at least one chemical treatment is selected from the group consisting of de-halogenation, deoxidation of nitrogen oxide, and desulphurization.

10. The process of thermal destruction according to claim 8, further comprising spraying water on the gases obtained in e) before carrying out the chemical treatment of the gases obtained in e).

11. A device for thermal destruction of a product which is an organic product or an halogenated organic product, the device comprising:
   an inductively coupled plasma torch,
   means for introducing plasmagenic gases into the torch,
   means for introducing a mixture of water and the product into the torch,
   a reaction chamber suitable for the thermal destruction of gases emerging from the torch,
   a device for carrying out the stirring of the gases emerging from the reaction chamber,
   means for introducing air or oxygen into the stirring device,
   a recombination by cooling device for recombining at least a part of the gases emerging from the stirring device by cooling,
   wherein the inductively coupled torch is connected to the reaction chamber, which is connected to the stirring device, which is, in turn, connected to the recombination by cooling device.

12. The thermal destruction device according to claim 11, further comprising cooling means for cooling the inductively coupled plasma torch, the reaction chamber, the stirring device and the recombination by cooling device.

13. The thermal destruction device according to claim 12, wherein the cooling means is a cooling plant.

14. The thermal destruction device according to claim 11, wherein the reaction chamber comprises a double wall in which cooling water circulates.

15. The thermal destruction device according to claim 14, wherein the internal surface of the double wall is covered with a refractory material.

16. The thermal destruction device according to claim 11, wherein the introduction of a plasmagenic gas into the torch is achieved using over-pressurization.

17. The thermal destruction device according to claim 11, wherein the means for introducing a mixture of water and the product into the torch is a spray probe when the mixture is in a liquid or suspension form, or is an injection probe when the mixture is in a gaseous form.

18. The thermal destruction device according to claim 11, wherein the stirring device for stirring gases is a venturi.

19. The thermal destruction device according to claim 18, wherein the venturi has a water-cooled double wall.

20. The thermal destruction device according to claim 18, wherein the venturi includes an upper part, which is a convergent, a lower part, which is a divergent, and a central part, which is a neck, which connects the convergent and the divergent, and air inlet ports.

21. The thermal destruction device according to claim 20, wherein the venturi comprises at least one distributing means for uniformly distributing air onto the venturi walls.

22. The thermal destruction device according to claim 21, wherein the at least one distributing means for uniformly distributing air onto the venturi walls is a distribution chamber which includes holes arranged around its perimeter.

23. The thermal destruction device according to claim 11, wherein the recombination by cooling device used for recombination by cooling of at least a part of the gases emerging from the stirring device is a water-cooled double walled enclosure.

24. The thermal destruction device according to claim 11, further comprising at least a device selected from the group consisting of a device for exchanging heat with the surroundings and a device for regulating the pressure inside the destruction device.

25. The thermal destruction device according to claim 24, wherein the device used to regulate the pressure is a vacuum plant.

26. The thermal destruction device according to claim 11, further comprising at least one device for chemically treating the gases emerging from the recombination device, wherein the at least one device for chemically treating the gases is located after the gas recombination device.

27. The thermal destruction device according to claim 26, wherein the at least one device for chemically treating the gases emerging from the recombination device carries out a reaction selected from the group consisting of de-halogenation, deoxidation of nitrogen oxide, and desulphurization.

* * * * *